(12) United States Patent
Okada et al.

(10) Patent No.: US 7,500,297 B2
(45) Date of Patent: Mar. 10, 2009

(54) MACHINING CENTER

(75) Inventors: Satoshi Okada, Aichi pref. (JP);
Tomohiro Kintoki, Aichi pref. (JP);
Masaki Tanase, Aichi pref. (JP)

(73) Assignee: Yamazaki Mazak Corporation, Aichi Pref (JP)

( * ) Notice: Subject to any disclaimer, the term of this patent is extended or adjusted under 35 U.S.C. 154(b) by 0 days.

(21) Appl. No.: 11/934,107

(22) Filed: Nov. 2, 2007

(65) Prior Publication Data
US 2008/0178447 A1    Jul. 31, 2008

(30) Foreign Application Priority Data
Jan. 30, 2007    (JP) .............................. 2007-019639

(51) Int. Cl.
*B23B 27/00*    (2006.01)
(52) U.S. Cl. .............................. 29/27 C; 29/50; 409/203
(58) Field of Classification Search ................ 29/27 C, 29/26 A, 50, 51, 52, 53, 54, 55; 409/203, 409/212, 213, 144
See application file for complete search history.

(56) References Cited

U.S. PATENT DOCUMENTS

| | | | | | |
|---|---|---|---|---|---|
| 2,887,016 | A | * | 5/1959 | Daugherty et al. | ........... 409/212 |
| 4,118,844 | A | * | 10/1978 | Matsuzaki et al. | ........... 29/27 C |
| RE31,288 | E | * | 6/1983 | Matsuzaki et al. | ........... 29/27 C |
| 4,945,958 | A | * | 8/1990 | Shoda | ........................ 144/1.1 |
| 4,949,443 | A | * | 8/1990 | Saruwatari et al. | ........... 29/27 C |
| 4,949,942 | A | * | 8/1990 | Shoda | ........................... 269/21 |
| 5,075,530 | A | * | 12/1991 | Lee | ........................... 219/69.11 |
| 5,848,458 | A | * | 12/1998 | Bullen | ........................ 29/33 K |
| 5,848,863 | A | * | 12/1998 | Liao | ............................. 409/203 |

(Continued)

FOREIGN PATENT DOCUMENTS

DE        29504342        5/1995

(Continued)

OTHER PUBLICATIONS

European Search Report for corresponding Application No. 07405312.5 dated Feb. 13, 2008.

(Continued)

*Primary Examiner*—Dana Ross
(74) *Attorney, Agent, or Firm*—Renner, Otto, Boisselle & Sklar, LLP

(57) ABSTRACT

The invention provides a machining center having a first main spindle unit and also a second main spindle unit with a ram shaft attached to a vertical machining center. A machining center 1 comprises a rotary table 20 that moves in the direction of an X-axis on a bed 10, and a cross rail 40 supported by a column 30 and moving in the direction of a Z-axis. A first main spindle unit 60 is attached to a saddle 50 supported by the cross rail and moving in the direction of a Y-axis. The first main spindle unit 60 is equipped with a first main spindle 70 that rotates around a B-axis. A second main spindle unit 100 disposed between the first main spindle unit 60 and the saddle 50 is equipped with a ram shaft 110 that moves in the direction of a W-axis and a turning head or a milling head that is replaceably attached to the leading end of the ram shaft.

5 Claims, 8 Drawing Sheets

U.S. PATENT DOCUMENTS

| | | | | |
|---|---|---|---|---|
| 5,980,172 | A * | 11/1999 | Shoda | 409/203 |
| 6,394,892 | B2 * | 5/2002 | Hanisch et al. | 451/259 |
| 6,502,002 | B2 * | 12/2002 | Susnjara et al. | 700/95 |
| 6,600,250 | B1 * | 7/2003 | Fedeli | 310/114 |
| 6,948,894 | B2 * | 9/2005 | Taga et al. | 409/235 |
| 7,134,173 | B2 * | 11/2006 | Gstir et al. | 29/27 C |
| 7,159,294 | B2 * | 1/2007 | Yamazaki et al. | 29/564 |
| 7,172,375 | B2 * | 2/2007 | Tanoue et al. | 409/202 |
| 7,201,546 | B2 * | 4/2007 | Ichino et al. | 409/165 |
| 7,255,519 | B2 * | 8/2007 | Tanoue et al. | 409/134 |
| 2002/0006764 | A1 | 1/2002 | Hanisch et al. | |
| 2005/0217095 | A1 * | 10/2005 | Gstir et al. | 29/27 C |
| 2006/0018725 | A1 * | 1/2006 | Ichino et al. | 409/131 |

FOREIGN PATENT DOCUMENTS

| | | |
|---|---|---|
| DE | 199 19 645 A1 | 11/2000 |
| DE | 2002 04 365 U1 | 5/2002 |
| DE | 10 2004 058 891 A | 6/2006 |
| EP | 0 314 824 A1 | 5/1989 |
| EP | 1 452 270 A1 | 9/2004 |
| EP | 1 842 621 A1 | 10/2007 |
| JP | 06-126514 A | 10/1991 |
| JP | 11-114759 | 4/1999 |
| JP | 2001-150256 | 6/2001 |
| JP | 2004-066430 | 3/2004 |
| JP | 2004-130423 | 4/2004 |
| JP | 2007-000966 | 1/2007 |

OTHER PUBLICATIONS

Extended European Search Report for corresponding Application No. 07405312.5 dated Mar. 28, 2008.

* cited by examiner

MACHINING CENTER

The present application is based on and claims priority of Japanese patent application No. 2007-19639 filed on Jan. 30, 2007, the entire contents of which are hereby incorporated by reference.

BACKGROUND OF THE INVENTION

1. Field of the Invention

The present invention relates to a machining center comprising, in addition to a first main spindle, a second main spindle having a long protruding length for providing turning and milling processes to inner bore portions and the like of a work.

2. Description of the Related Art

Japanese Patent Application Laid-Open Publication No. 2004-66430 (patent document 1) discloses an arrangement of a complex five-axis finishing machine, and Japanese Patent Application Laid-Open Publication No. 2001-150256 (patent document 2) discloses a machining center equipped with a turning head disposed separately from a main spindle head.

Further, Japanese Patent Application Laid-Open Publication No. 2004-130423 (patent document 3) discloses a so-called angle head that converts the rotary force of a tool shank to a right-angle force and transmits the same to a tool.

Japanese Patent Application Laid-Open Publication No. 11-114759 (patent document 4) discloses a machine tool having a two-step feed driving system and equipped with a main spindle head for replaceably attaching tools on a leading end of a ram, and Japanese Patent Application Laid-Open Publication No. 2007-966 (patent document 5) discloses a similar type of machine tool.

SUMMARY OF THE INVENTION

The object of the present invention is to provide a machining center having in addition to a first main spindle a second main spindle especially capable of performing a long boring process.

In order to achieve the above object, the machining center of the present invention comprises, as basic means, a vertical machining center having a table disposed horizontally and a processing unit disposed perpendicularly, wherein the processing unit comprises a first main spindle unit, and a second main spindle unit having an axis of movement that is parallel to the axis of movement of the first main spindle unit.

Further, the vertical machining center is a gate-type machining center comprising a rotary table disposed on a bed, a means for moving a rotary table in an X-axis direction, a pair of columns disposed vertically on both sides of a bed, a cross rail supported by the column, a means for moving the cross rail in a Z-axis direction, a saddle supported by the cross rail and having a processing unit, and a means for moving the saddle in a Y-axis direction; or the vertical machining center is a column-type machining center comprising a rotary table disposed on a bed, a saddle moving on the table in an X-axis direction, a column moving on the saddle in a Y-axis direction, and a processing unit moving on a front side of the column in a Z-axis direction.

Moreover, the first main spindle unit comprises a first processing head disposed rotatably around a B-axis orthogonal to a Z-axis and a rotating mechanism that rotates the first processing head around the B-axis, and the second main spindle unit is disposed in a space formed between the rotating mechanism of the first processing head and the saddle; and the second main spindle unit comprises a ram shaft controlled to move in a W-axis direction parallel to a Z-axis, a ram head attached to a lower end portion of the ram shaft, and a turning head and a milling head replaceably attached to the ram head.

Even further, the ram head comprises a hydraulic clamp unit that replaceably supports the turning head or the milling head, and the second main spindle unit comprises a motor disposed on an upper portion of the ram shaft, a driving shaft for transmitting the driving force of the motor, a means for transmitting the rotary force of the driving shaft via a transmission mechanism to an output shaft disposed on a lower end of the ram shaft, and a clutch disposed on a leading end of the output shaft.

Moreover, the milling head comprises an input shaft connected to a clutch of the ram shaft, a power transmission mechanism for orthogonally converting the driving force of the input shaft and transmitting the same to a spindle, and a milling tool attached to the spindle.

As described, the machining center according to the present invention has a first main spindle unit that rotates around a B-axis and a second main spindle unit having a ram shaft which are disposed on a common saddle. Thus, when processing a bore at a deep area of the work, the saddle can be lowered to directly above the work on a Z-axis and then processing can be performed with a shortest possible projection length of the ram shaft, so that the processing effect can be improved.

Furthermore, since the ram shaft can be arranged between the B-shaft driving mechanism and the saddle, efficient use of space can be realized.

DETAILED DESCRIPTION OF THE PREFERRED EMBODIMENTS

Figure 1:
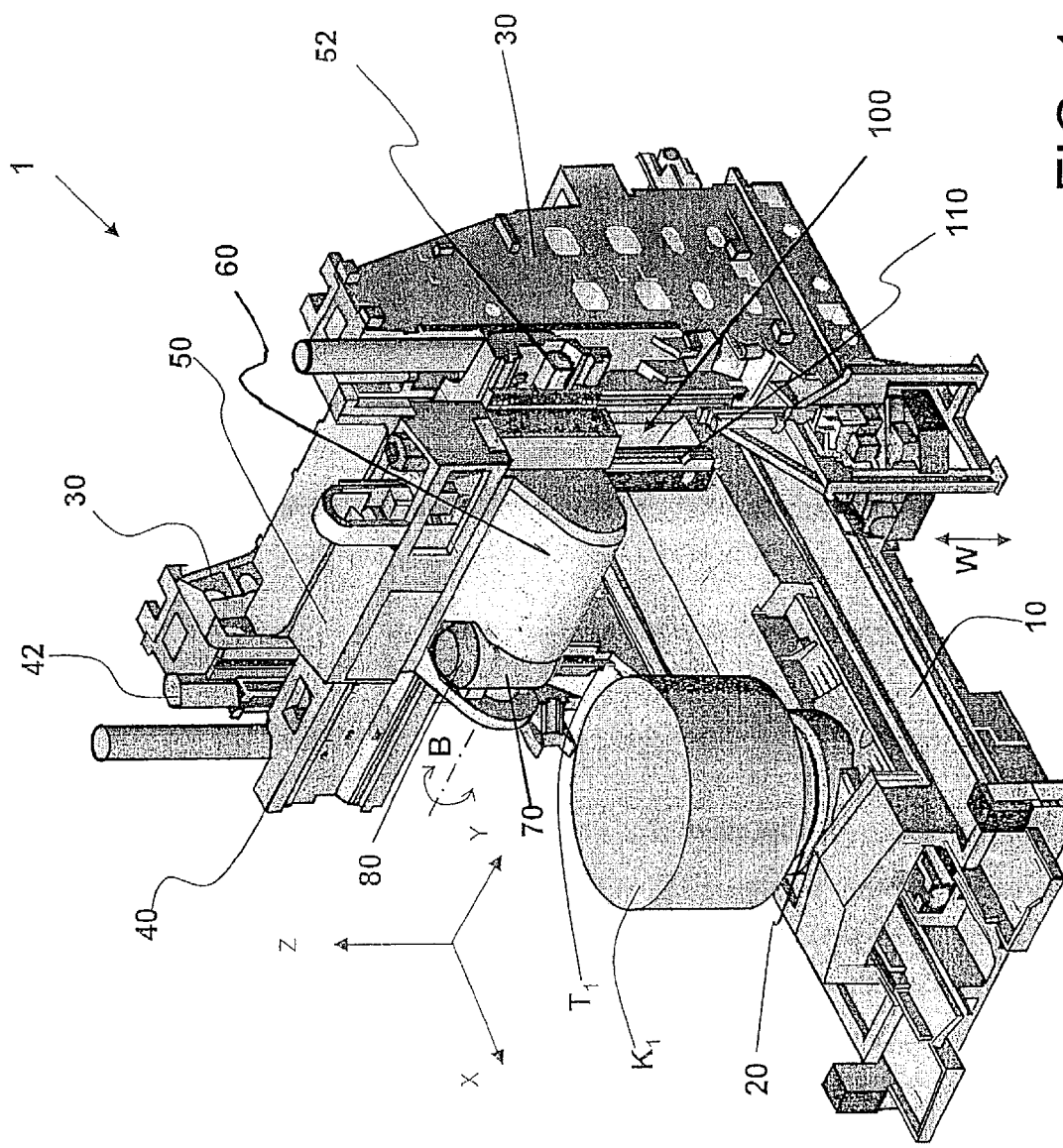
FIG. 1 is a perspective view of the machining center to which the present invention is applied.
Figure 2:
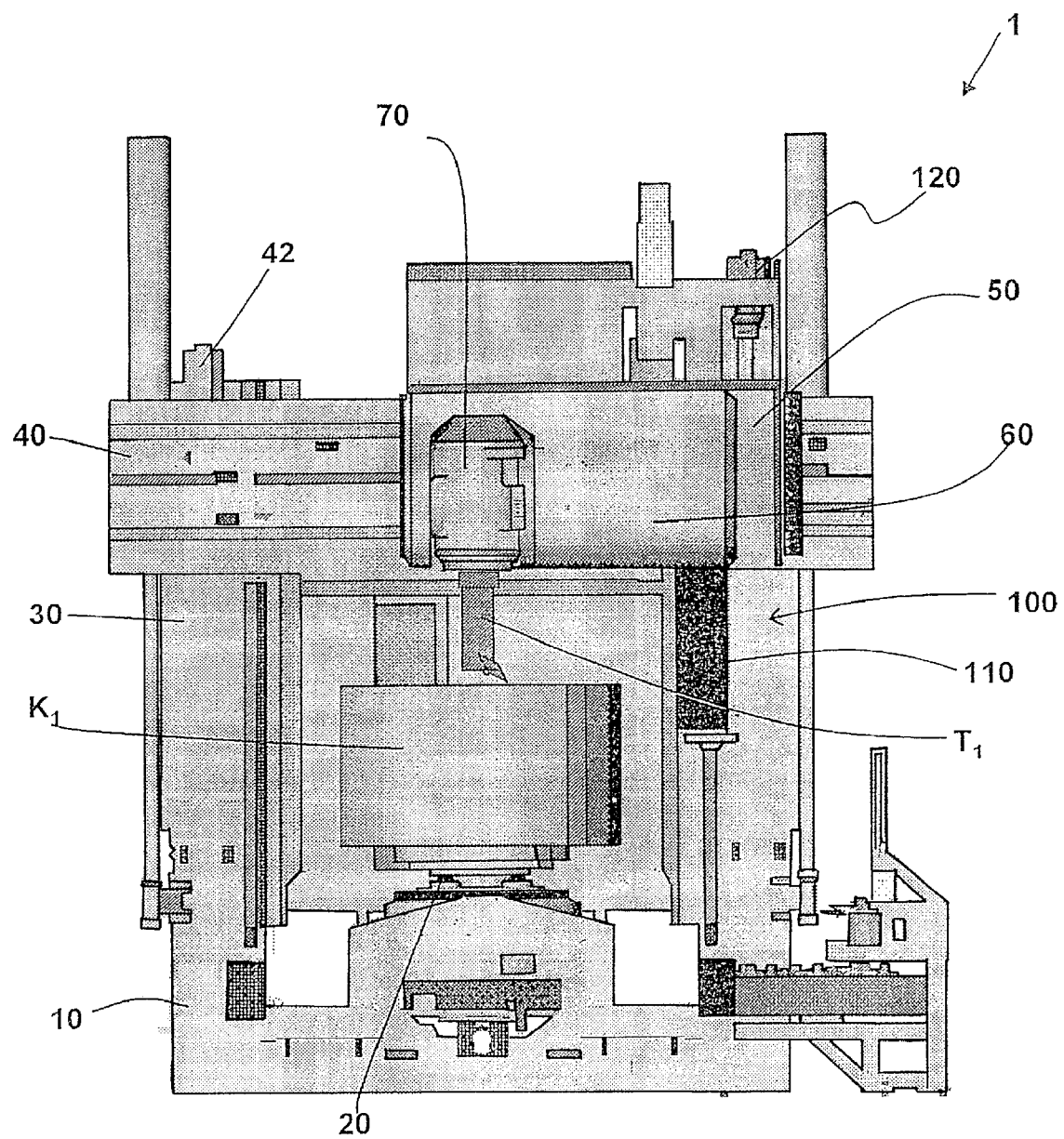
FIG. 2 is a front view of the machining center to which the present invention is applied.

FIG. 1 is a perspective view showing the external appearance of a machining center to which the present invention is applied, and FIG. 2 is a front view thereof.

The machining center shown as a whole by reference number 1 is a so-called gate-type machining center including a rotary table 20 disposed on a bed 10, wherein the table is controlled to move along an X-axis. A pair of columns 30 is disposed vertically on both sides of the bed 10, and across rail 40 capable of moving arbitrarily along a Z-axis by a linear guide is disposed between the columns 30. The cross rail 40 is controlled to move by a servomotor 42 in the direction of the Z-axis via a ball screw or the like.

A saddle 50 is disposed to move arbitrarily along a Y-axis on the cross rail 40 by a linear guide. The saddle 50 is controlled to move in the direction of the Y-axis by a servomotor 52 and a ball screw. A first main spindle unit 60 is disposed on the saddle 50. A first main spindle 70 is disposed on the first main spindle unit 60, capable of being rotated arbitrarily around a B-axis. A tool $T_1$ is disposed on the first main spindle 70. The tool $T_1$ to be attached to the first main spindle 70 is either a turning tool or a milling tool, which is used to provide necessary turning processes or milling processes and the like to a work $K_1$ chucked on the table 20. A second main spindle unit 100 is disposed on a rear side of the first main spindle unit 60 on the saddle 50.

The second main spindle unit 100 comprises a ram shaft 110, and the ram shaft 110 is controlled to move along a W-axis parallel to the Z-axis by a servomotor 120 and a ball spring.

Figure 3:
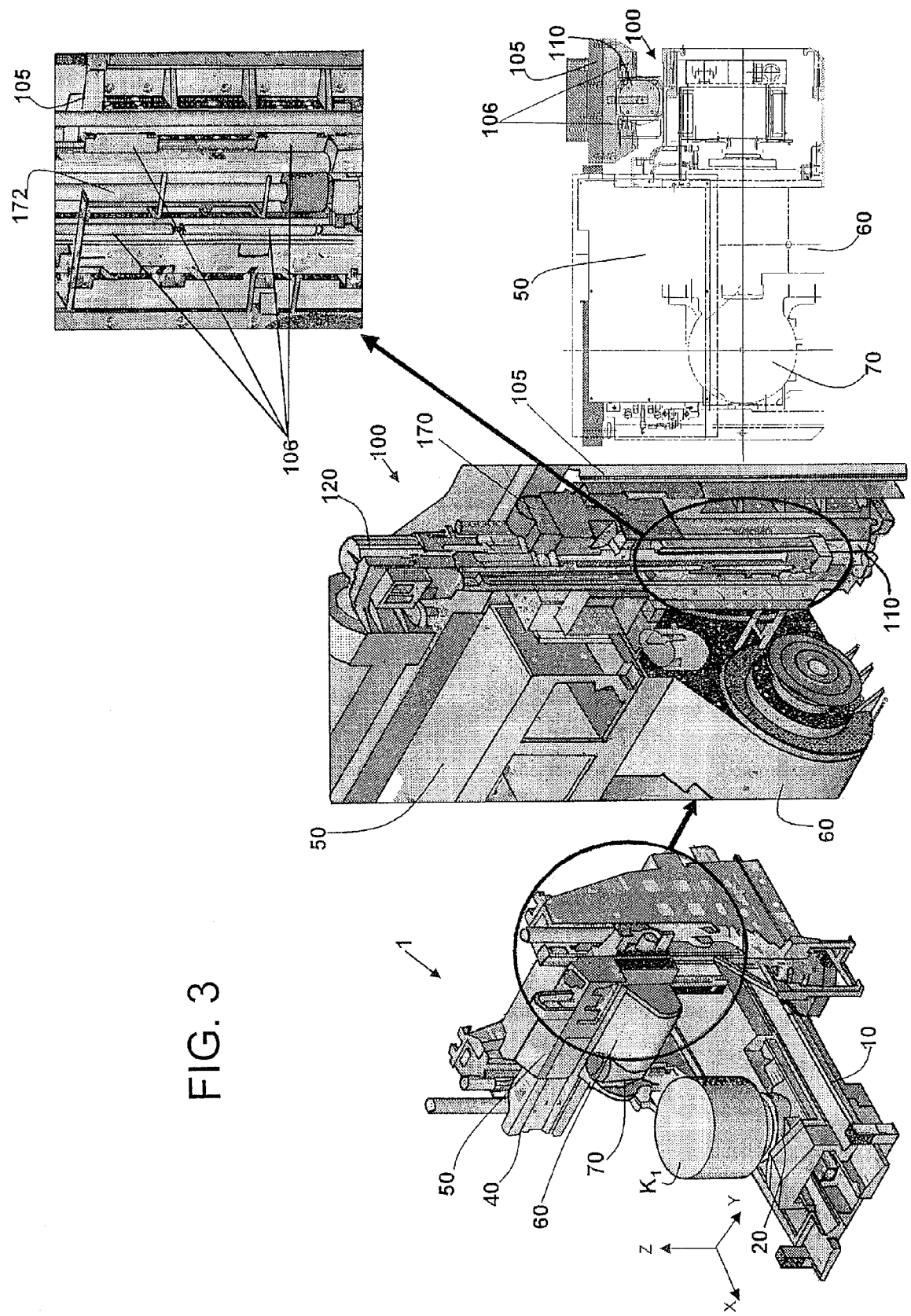
FIG. 3 is an explanatory view showing the arrangement of a second main spindle unit.

FIG. 3 is an explanatory view showing the details of the second main spindle unit 100.

The second main spindle unit 100 has a plurality of linear guide blocks 106 fixed to the side having a head unit 105, and slidably supports the ram shaft 110. The plurality of linear guide blocks 106 is disposed above and below the head unit 105 at a distance therefrom, designed to maintain sufficient rigidity even when the ram shaft 110 is arranged at a protruded position.

The ram shaft 110 is controlled to move in the direction of the W-axis by a servomotor 120 and via a ball spring.

The second main spindle unit 100 can be displaced using the space existing between the saddle 50 and the first main spindle unit 60 comprising the mechanism to drive the first main spindle 70 around the B-axis, so there is no need to prepare any excessive space.

Figure 4:
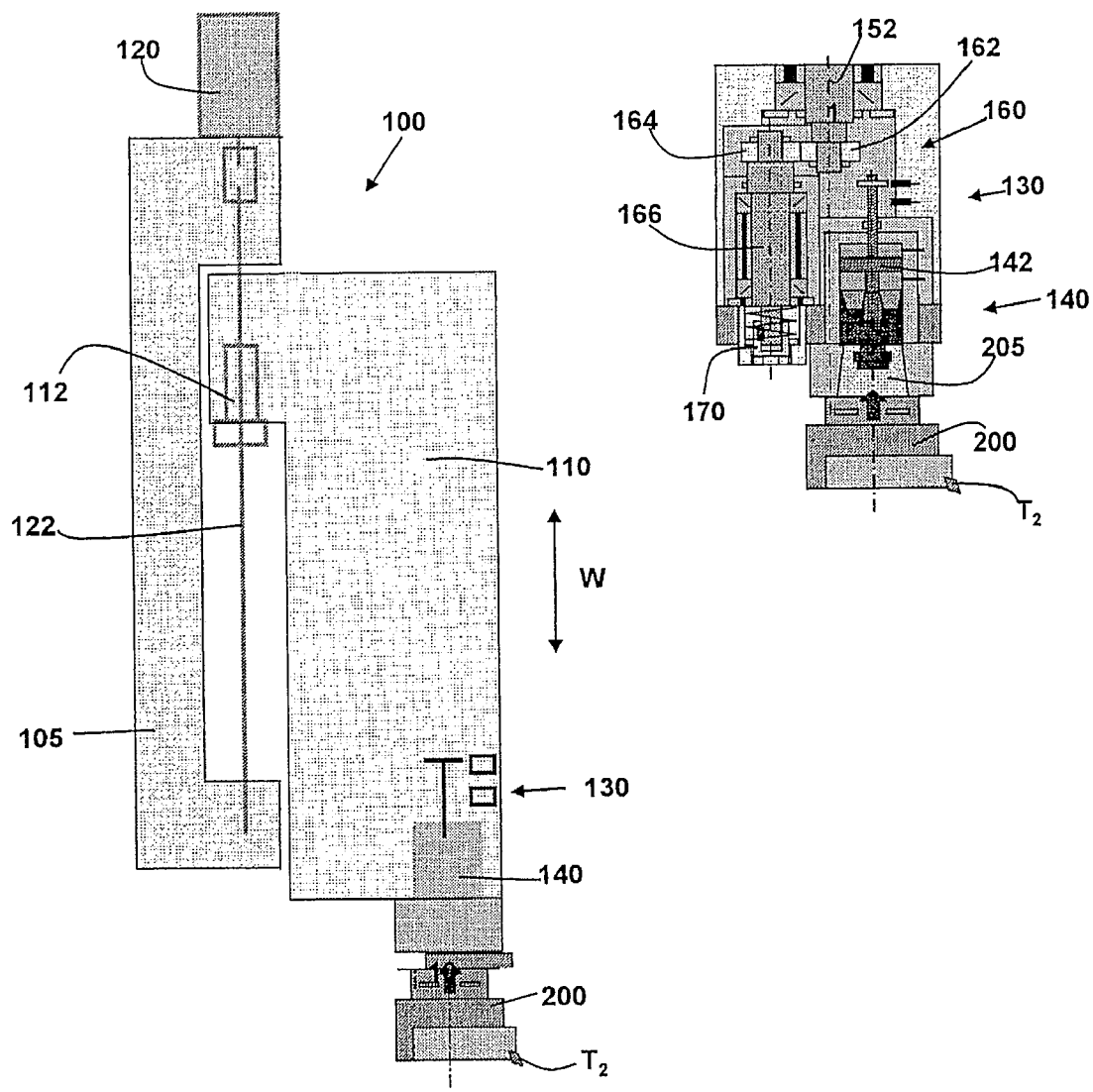
FIG. 4 is an explanatory view showing an example in which a turning head is attached to the second main spindle unit.

FIG. 4 is an explanatory view showing the outline of the arrangement of the second main spindle unit 100.

The servomotor 120 attached to the head unit 105 moves the ram shaft 110 in the direction of the W-axis via a drive system such as a ball spring.

A ram head 130 is attached to the lower end of the ram shaft 110.

The ram head 130 comprises a hydraulic clamp unit 140 and a gear transmission mechanism 16. During the turning process, a turning head 200 is attached to the ram head 130. A turning tool $T_2$ is attached to the turning head 200, which is fixed to the ram shaft 110 via the hydraulic clamp unit 140 of the ram head 130.

The hydraulic clamp unit 140 has a piston 140 operated via hydraulic pressure, which supports the turning head 200 using a taper shank 205.

Figure 5:
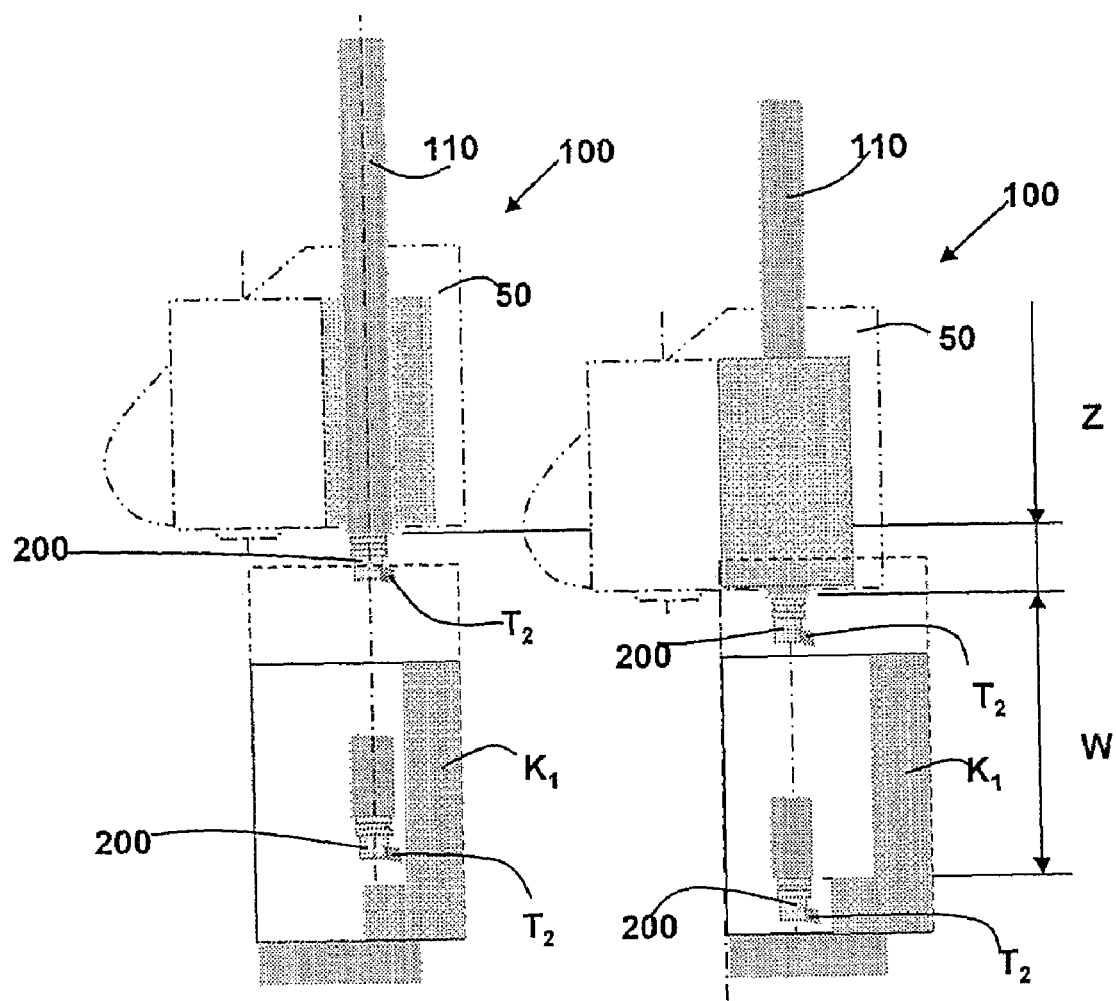
FIG. 5 is an explanatory view showing the turning process performed by the second main spindle unit.

FIG. 5 shows a case in which the second main spindle unit 100 is used to subject a work $K_1$ to a bore turning process.

The second main spindle unit 100 can subject deep areas of the work $K_1$ to turning process by projecting the ram shaft 110.

According to the machining center of the present invention, after lowering the cross rail and the saddle 50 along the Z-axis to approximate the upper surface of the work $K_1$, the ram shaft 110 is projected along the W-axis so as to subject deep areas of the work $K_1$ to a turning process efficiently.

Figure 6:
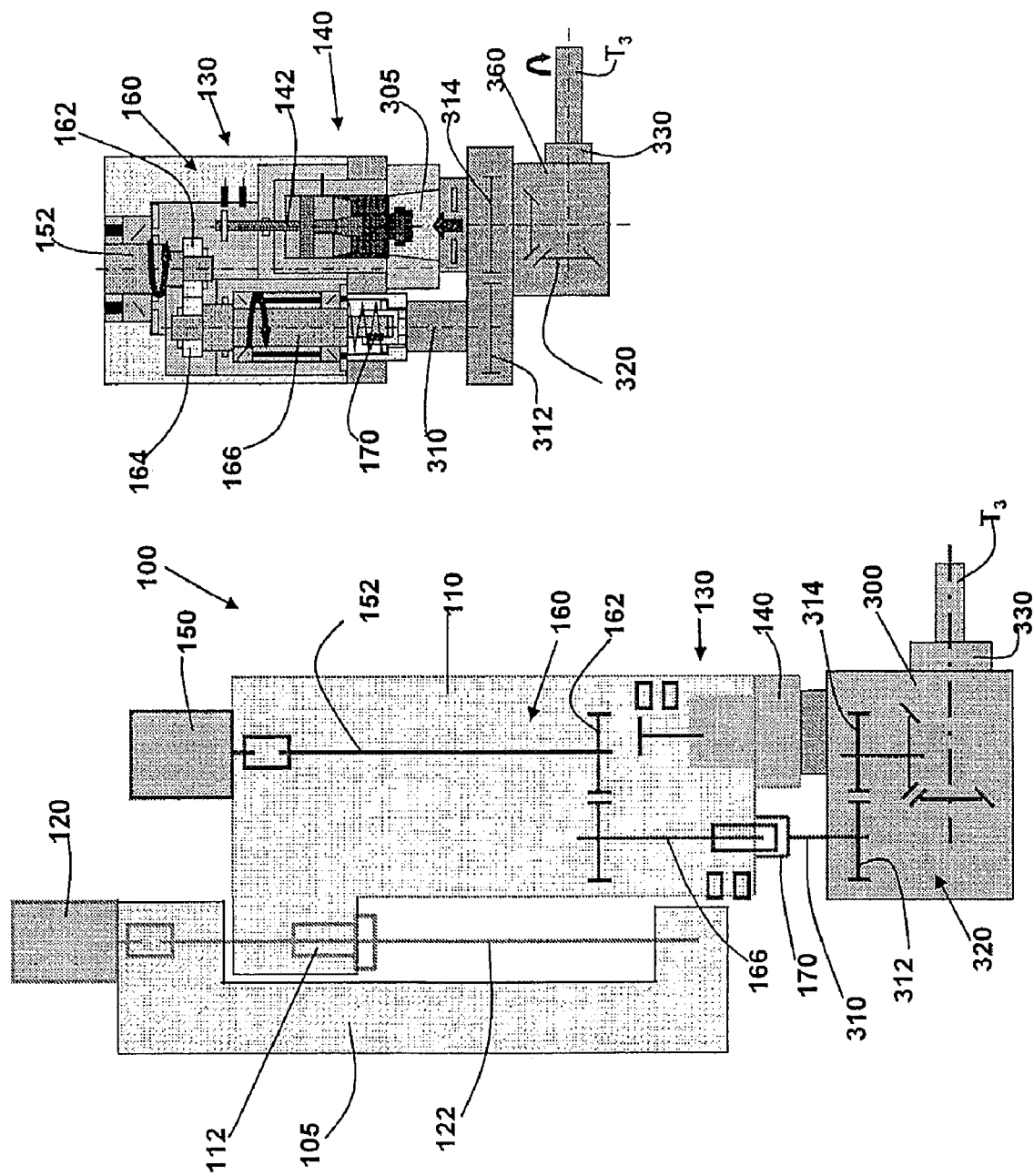
FIG. 6 is an explanatory view showing an example in which a milling head is attached to the second main spindle unit.

FIG. 6 illustrates a state in which a milling head 300 is attached to the ram head 130 at the leading end of the ram shaft.

The milling head 300 is supported by the hydraulic clamp unit 140 of the ram head 130 using a shank 305. This supporting mechanism is similar to how the turning head 200 is supported.

The second main spindle unit 100 has a mill driving motor 150 disposed at the upper portion of the ram shaft 110, and drives the gear transmission mechanism 160 disposed on the side of the ram head 130 via the driving shaft 152. The gear transmission mechanism 160 comprises a pair of mesh gears 162 and 164, and drives an output shaft 166.

A clutch 170 is disposed at the leading end of the drive shaft 166, which is connected to an input shaft 310 disposed on the side of the milling head 300. The milling head 300 comprises a pair of mesh gears 312 and 314 and a bevel gear 320, and drives a spindle 330 disposed in a direction orthogonal to the input shaft 310. A mill tool $T_3$ is attached to the spindle 330.

As described, since the driving mechanism of the milling head of the present invention has its driving system arranged at a position offset from the axis line of the hydraulic clamp unit, the milling head can be effectively downsized.

Furthermore, since the driving motor of the mill tool can be disposed at the upper portion of the ram shaft, the structure thereof can be simplified.

Figure 7:
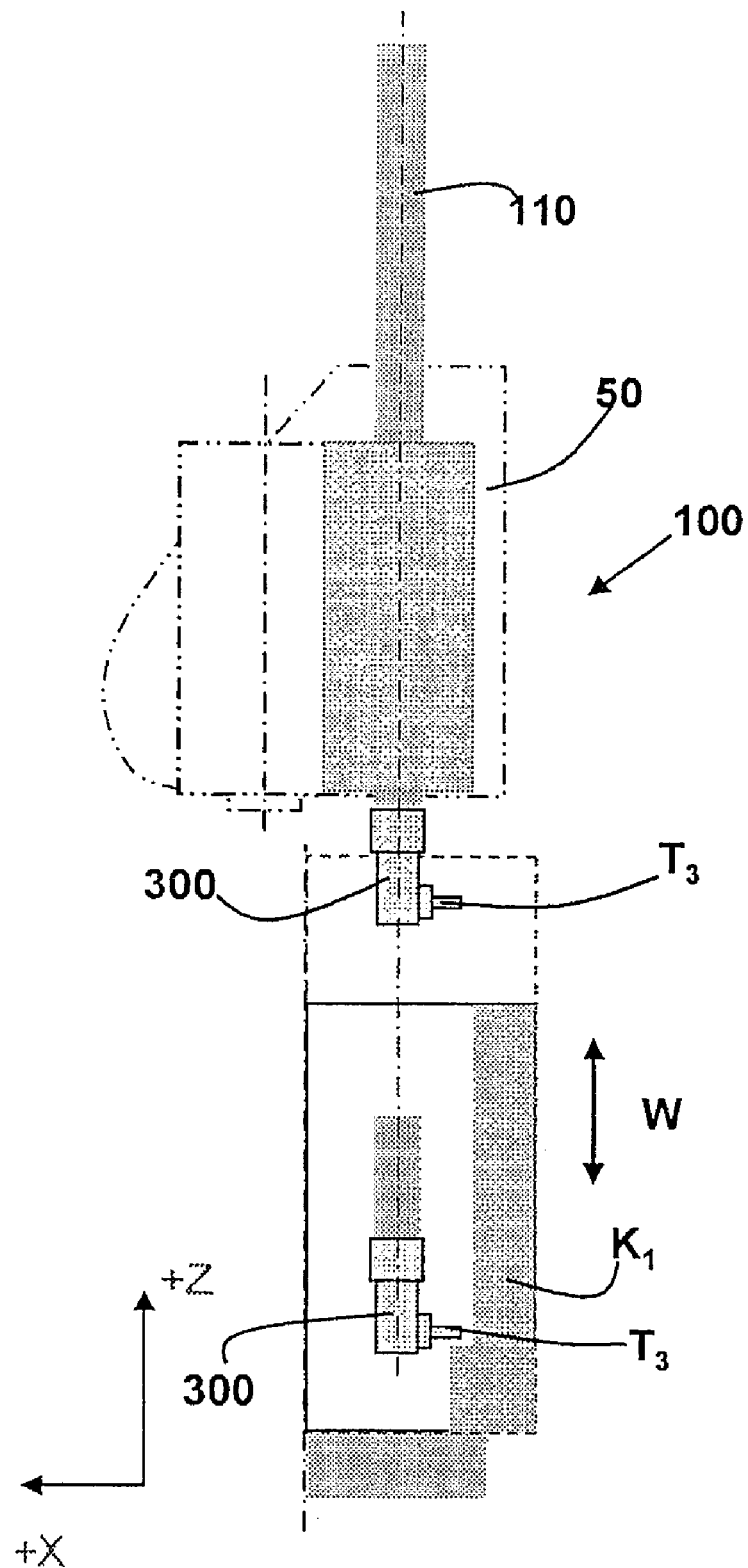
FIG. 7 is an explanatory view showing the mill processing performed by the second main spindle unit.

FIG. 7 shows a case in which the ram shaft 110 equipped with the milling head 300 which is an angle head is extended so as to provide a milling process using a mill tool $T_3$ to a deep portion of the work $K_1$.

According to the above-described embodiment, the present invention is applied to a gate-type machining center, but the present invention can also be applied to other types of machining centers.

Figure 8:
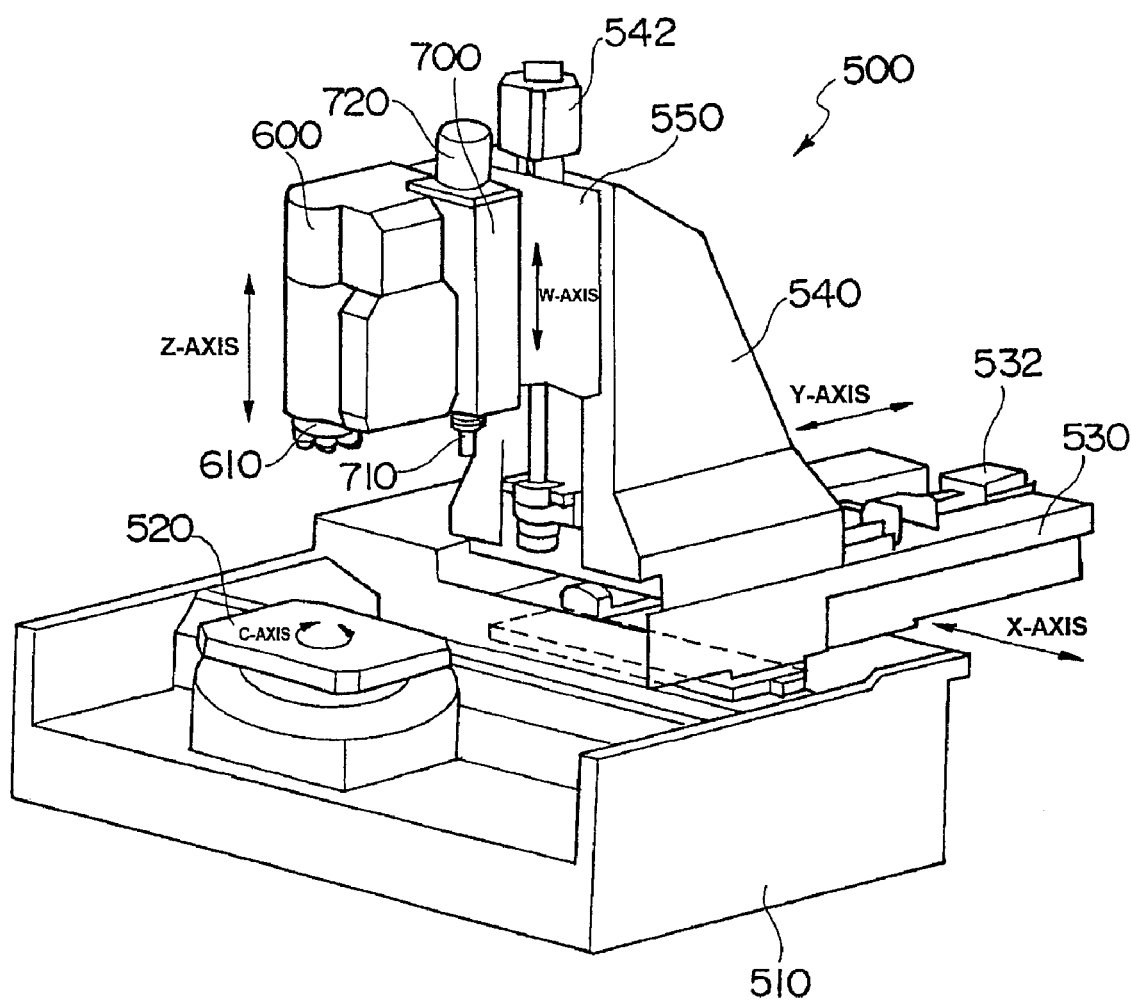
FIG. 8 is a perspective view of another machining center to which the present invention is applied.

FIG. 8 illustrates an example in which the present invention is applied to a column-type machining center.

The machining center illustrated as a whole by reference number 500 has a rotary table 520 disposed on a bed 510. A saddle 530 is disposed so as to be moved arbitrarily in an X-axis direction on the bed 510. A column 540 is disposed slidably in a Y-axis direction on the saddle 530, which is controlled to move by a servomotor 532.

On the front side of the column 540 is disposed a head unit 550 capable of sliding arbitrarily in a Z-axis direction or perpendicular direction, which is controlled to move by a servomotor 542. A first main spindle unit 600 is attached to the head unit 550. The first main spindle unit 600 has a first main spindle 610, and subjects a work on the table 520 to necessary processes.

In addition to the first main spindle unit 600, a second main spindle unit 700 is attached to the head unit 550. The second main spindle unit 700 has a ram shaft 710, and the ram shaft 710 is controlled to move along a W-axis parallel to the Z-axis by a servomotor 720.

The functions of the first main spindle unit 600 and the second main spindle unit 700 are the same as those described in the aforementioned embodiment.

What is claimed is:

1. A vertical machining center having a table disposed horizontally and a processing unit disposed perpendicularly, wherein the processing unit comprises a first main spindle unit disposed on a saddle, and a second main spindle unit having an axis of movement that is parallel to the axis of movement of the first main spindle unit;

the first main spindle unit comprises a first processing head disposed rotatably around a B-axis orthogonal to a Z-axis and a rotating mechanism that rotates the first processing head around the B-axis;

the second main spindle unit comprises a ram shaft controlled to move in a W-axis direction parallel to a Z-axis, a ram head attached to a lower end portion of the ram shaft, and a turning head and a milling head replaceably attached to the ram head; and the ram head comprises a hydraulic clamp unit that replaceably supports the turning head or the milling head.

2. The machining center according to claim 1, wherein the vertical machining center is a gate-type machining center comprising:
- a rotary table disposed on a bed;
- a means for moving a rotary table in an X-axis direction within a horizontal plane;
- a pair of columns disposed vertically on both sides of a bed;
- a cross rail supported by the column;
- a means for moving the cross rail in a perpendicular Z-axis direction;
- the saddle supported by the cross rail and having a processing unit; and
- a means for moving the saddle in a Y-axis direction orthogonal to the X-axis within a horizontal plane.

3. The machining center according to claim 1, wherein the second main spindle unit comprises:
- a motor disposed on an upper portion of the ram shaft;
- a driving shaft for transmitting the driving force of the motor;
- a means for transmitting the rotary force of the driving shaft via a transmission mechanism to an output shaft disposed on a lower end of the ram shaft; and
- a clutch disposed on a leading end of the output shaft.

4. The machining center according to claim 1, wherein the milling head comprises:
- an input shaft connected to a clutch of the ram shaft;
- a power transmission mechanism for orthogonally converting the driving force of the input shaft and transmitting the same to a spindle; and
- a milling tool attached to the spindle.

5. The machining center according to claim 1, wherein the second main spindle unit is arranged in a space defined by the rotating mechanism of the first main spindle unit and the saddle.

* * * * *